April 7, 1953 W. E. JOHNS 2,634,086
VALVE WITH SELF-CONTAINED STEM CENTERING DEVICE
Filed Aug. 15, 1950 2 SHEETS—SHEET 1

INVENTOR.
Wilfred E. Johns,
BY
Schroeder, Merriam, Hofgren & Brady
Attys.

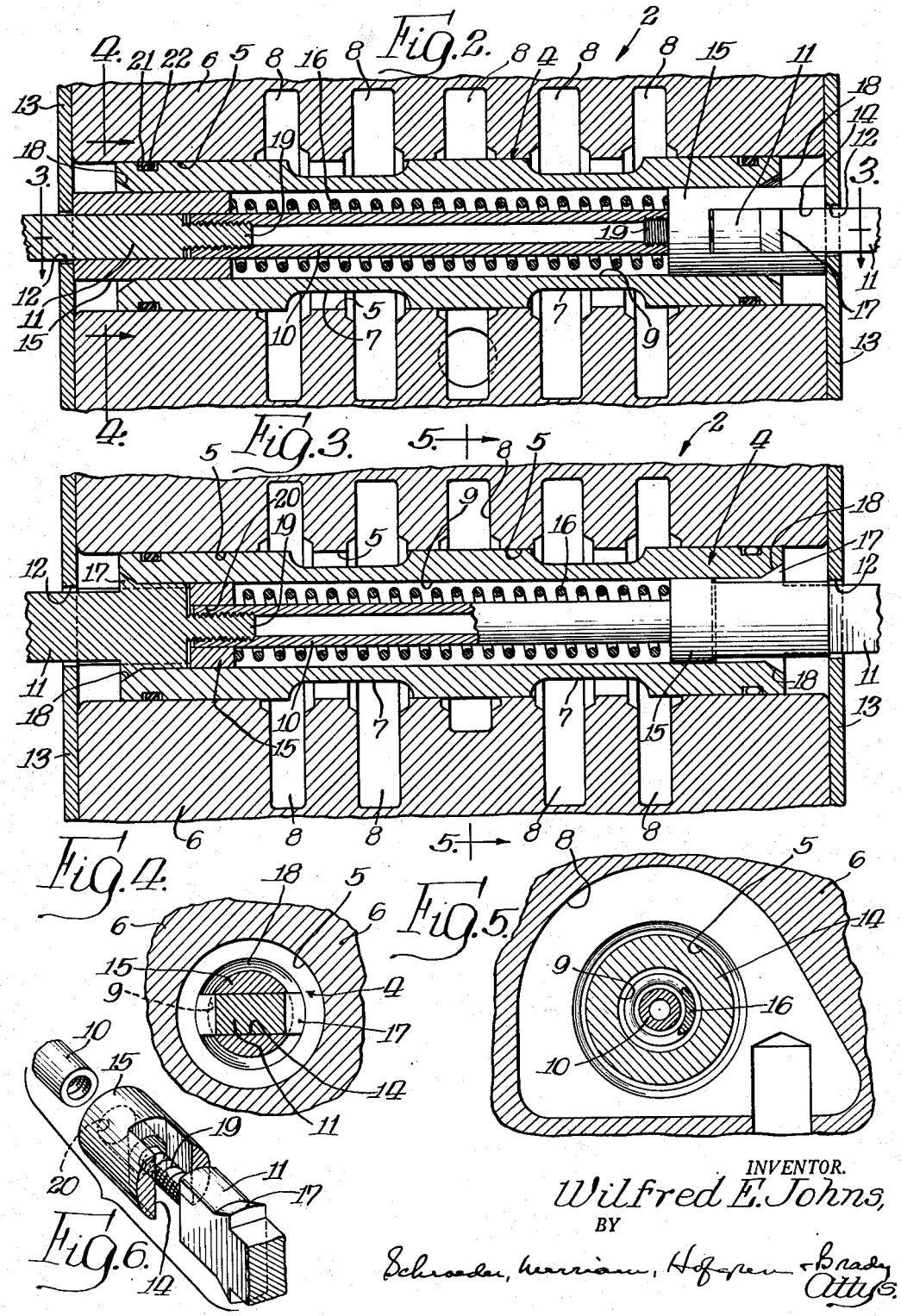

Patented Apr. 7, 1953

2,634,086

UNITED STATES PATENT OFFICE 2,634,086

VALVE WITH SELF-CONTAINED STEM CENTERING DEVICE

Wilfred E. Johns, Rockford, Ill., assignor to Sundstrand Machine Tool Co., a corporation of Illinois Application August 15, 1950, Serial No. 179,568

7 Claims. (Cl. 251—76)

This invention relates to a valve centering device comprising mainly a single means set within the valve itself and which is adapted to return the valve to its normal or off position after the valve has been moved away from its normal position by any appropriate means.

It is the general object of this invention to provide a new, improved and more accurate centering device for valve assemblies.

Another object of this invention is to provide a spool type valve having a hollow core, plungers extending out through openings in each end of the core and having means to limit their outward movement, means for moving the valve to the right or left of a normal position, and a coil spring compressed between said plungers and operating to bias them into extended position, the plungers in their extended position serving to center the valve.

A further object of this invention is to provide a new and improved valve centering device which is operated with a single spring so that spring fatigue will have substantially no effect on the accuracy of centering of the valve. Regardless of the fatigue in a single spring, the pressure it exerts in opposite directions remains the same.

A further object of this invention is to provide a unitary self-centering valve which may be inserted or removed from a valve body in one piece.

Further objects will be readily apparent from the following detailed description read in conjunction with the accompanying drawings, wherein:

Fig. 2 is a sectional view of the valve assembly taken substantially along the line 2—2 of Fig. 1;

Fig. 3 is a sectional view of the valve assembly taken substantially along the line 3—3 of Fig. 2;

Fig. 4 is a sectional view taken along the line 4—4 of Fig. 2;

Fig. 5 is a sectional view taken substantially along the line 5—5 of Fig. 3; and Fig. 6 is a detailed view of the actuating plunger for moving the valve.

Figure 1:
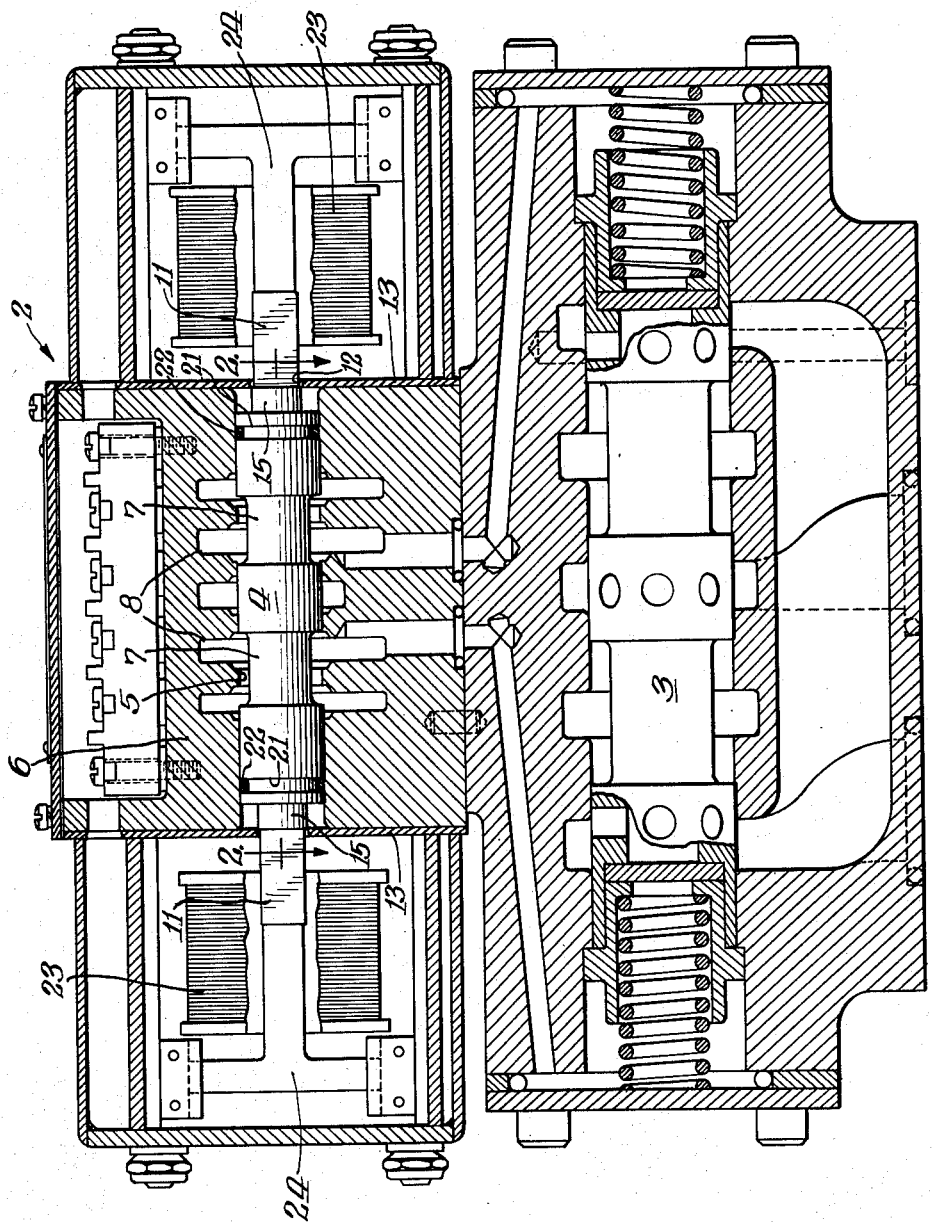
Fig. 1 is a sectional view of a valve mechanism embodying a preferred form of the invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to Fig. 1 of the drawings, there is shown a pilot valve 2 connected to a main valve 3 with the latter being adapted to be actuated by pilot pressure delivered from the pilot valve.

The pilot valve 2 comprises a spool valve 4 slidable in a cylindrical bore 5 extending through a casing 6. The spool valve is provided with a pair of reduced portions 7 adapted to communicate with a plurality of grooves 8 extending around the bore 5, which grooves are to be supplied with pilot fluid under pressure.

As best shown in Figs. 2 and 3, the pilot valve 4 is provided with a hollow core 9 which extends from end to end of the valve. Extending through the core is a rod 10 threaded at each end to a plunger 11 which extends outwardly through holes 12 provided in end plates 13 which close each end of the bore 5. The plungers 11 are slidably mounted in a U-shaped slot 14 provided at the outer ends of stop members 15, one stop member being located at each end of the bore. The outer ends of the stop members bear against the end plates 13 and the inner ends of the stop members bear against a compression spring 16 which surrounds the rod 10. The plungers 11 are provided with beveled portions 17 which are press fitted into correspondingly beveled portions 18 at the outer ends of the spool valve 4. Each of the plungers 11 is provided with a threaded extension 19 extending through an opening 20 in the inner ends of the stop members and adapted to be threaded into the ends of the rod 10. Thus the plungers 11 are secured to the rod 10 and to the spool valve 4 and are movable inwardly and outwardly in the U-shaped slots 14.

The outer ends of the spool valve 4 are provided with annular grooves 21, in each of which is seated a sealing ring 22 in order to prevent leakage of fluid from the outer ends of the bore 5.

In the specific embodiment chosen for illustration, the means for moving the plungers inwardly and outwardly comprises solenoids 23 located at each end of the pilot valve 2 with each of the solenoids being provided with an armature 24 connected to the plungers 11.

With energization of one of the solenoids, for example the left-hand solenoid shown in Fig. 1, the armature 24 associated therewith is moved to the right moving the left-most plunger 11 to the right. Rightward movement of that plunger brings its inner end into contact with the left-most stop member 15 to move that member to the right compressing the spring 16. Inasmuch as the plunger is secured to the spool valve 4 that member is also moved to the right to direct hydraulic fluid to one or the other ends of the main valve 3. Rightward movement of the right-hand stop member 15 is prevented because of the engagement of the outer ends thereof with the right-hand end plate 13. With deenergization of the solenoid, the compression spring 16 serves to move the stop member to the left, which movement carries the plunger 11 along with it and the latter member by reason of its connection with the spool valve serves to center the valve and bring it to "off" or "central" position. Similarly energization of the right-hand end serves to move the pilot valve to the left in a manner similar to that just described.

I claim:

1. A self-centering valve comprising a casing having a bore, a valve member having a hollow core and slidable within the bore, a stop member at each end of the core, each of the stop members having one end extending slidably into the core and having the other end abutting against a member fixed to the casing, a plunger secured to each end of the valve member and movable longitudinally of the bore, a rod extending through the core and connected to each of the plungers, a compression spring surrounding the rod and having its ends bearing against the inner ends of the stop members and means on each plunger adapted to contact the adjacent stop member to move such stop member inwardly along with the valve member with inward movement of the plunger whereby to compress the spring against the opposite stop member to bias the valve member toward return movement.

2. A self-centering valve comprising a casing having a bore, a valve member having a hollow core and slidable within the bore, a stop member at each end of the core, each of the stop members having one end extending slidably into the core with the other end of the stop member being slotted and abutting against a member fixed to the casing, a plunger secured to each end of the valve member and movable longitudinally of the bore in said slots, a rod extending through the core and connected to each of the plungers, a compression spring surrounding the rod and having its ends bearing against the inner ends of the stop members and means on each plunger adapted to contact the adjacent stop member to move such stop member inwardly along with the valve member with inward movement of the plunger whereby to compress the spring against the opposite stop member to bias the valve member toward return movement.

3. A self-centering valve comprising a casing having a bore, a valve member having a hollow core and slidable within the bore, a stop member at each end of the core, each of the stop members having one end extending slidably into the core with the other end of the stop member being slotted and abutting against a member fixed to the casing, a plunger press fitted into each end of the valve member and movable longitudinally of the bore in said slots, a rod extending through the core and connected to each of the plungers, a compression spring surrounding the rod and having its ends bearing against the inner ends of the stop members and means on each plunger adapted to contact the adjacent stop member to move such stop member inwardly along with the valve member with inward movement of the plunger whereby to compress the spring against the opposite stop member to bias the valve member toward return movement.

4. A self-centering valve comprising a casing having a bore, a valve member slidable within the bore and provided with a hollow core, a plunger at one end of the bore and secured to the valve member, a stop member slidable in the core and positioned to be contacted by the plunger with inward movement thereof to be moved therewith, a single compression spring extending longitudinally of the core, and stop means in the bore supporting one end of the spring, with the other end of the spring bearing against the stop member, whereby inward movement of the plunger moves the valve member in the bore and compresses said spring between the stop means and the stop member to bias the valve member toward return movement.

5. A self-centering valve comprising a casing having a bore, a valve member having a hollow core and slidable in the bore, a stop member at each end of the core, each of said stop members having an inner portion slidable within the core and an outer portion abutting against the casing, a compression spring in the core and extending between and contacting the inner portions of the stop members, an actuating member extending through the stop members and through the core, said actuating member being secured to the valve member and provided adjacent each end with a portion adapted to contact the stop member at that end upon inward movement of the actuating member to move the stop member therewith and means for moving the actuating member longitudinally of the core.

6. A self-centering valve comprising a casing having a bore, a valve member having a hollow core and slidable in the bore, a stop member at each end of the core, each of the stop members having an inner portion slidable within the core and an outer portion, a compression spring in the core and extending between and bearing against the inner portions of the stop members to press said outer portions of the stop members outwardly against the casing, oppositely facing actuating members secured to the valve member at each end of the core and adapted to move the adjacent stop member inwardly along with the valve member with movement thereof whereby to compress the spring against the opposite stop member to bias the valve member toward return movement.

7. A self-centering valve comprising a casing having a bore, a valve member having a hollow core and slidable in the bore, a stop member at each end of the core, each of the stop members having an inner portion slidable within the core and an outer portion, a compression spring in the core and extending between and bearing against the inner portions of the stop members to press said outer portions of the stop members outwardly against the casing, an actuating member secured to the valve member and adapted to move one of the stop members inwardly along with the valve member with movement of the valve member in one direction and to move the other stop member inwardly along with the valve member with movement of the valve member in the other direction whereby in either case to compress the spring against the unmoved stop member to bias the valve member toward return movement.

WILFRED E. JOHNS.

REFERENCES CITED

The following references are of record in the file of this patent:

UNITED STATES PATENTS

| Number | Name | Date |
|---|---|---|
| 2,145,977 | Foster | Feb. 7, 1939 |
| 2,238,768 | Berglund | Apr. 15, 1941 |
| 2,404,349 | Brandt | July 23, 1946 |